March 19, 1935.  E. D. WILSON  1,994,904

AUTOMATIC HEAT CONTROL

Filed April 22, 1933

WITNESSES:
E. A. McCloskey.
Roy W. Bailey

INVENTOR
Earl D. Wilson.
BY F. W. Lyle.
ATTORNEY

Patented Mar. 19, 1935

1,994,904

UNITED STATES PATENT OFFICE 1,994,904

AUTOMATIC HEAT CONTROL

Earl D. Wilson, Wilkinsburg, Pa., assignor to Westinghouse Electric & Manufacturing Company, East Pittsburgh, Pa., a corporation of Pennsylvania Application April 22, 1933, Serial No. 667,493

1 Claim. (Cl. 236—15)

My invention relates to temperature control apparatus and it has particular relation to automatic temperature regulating apparatus.

It is an object of my invention to provide temperature responsive apparatus that will instantaneously and continuously respond to variations in temperature.

Another object of my invention is to provide temperature responsive apparatus that shall automatically compensate for any variations from a predetermined temperature or temperature range.

Another object of my invention is to provide an electrical discharge device that is responsive to heat.

Another object of my invention is to provide an electrical discharge device having an envelope of good thermal conducting material and having a material emitting electrons in response to heat on the inside of the good thermal conducting material of the envelope.

Another object of my invention is to provide a heat-responsive electron discharge device immersed in the medium whose temperature is to be controlled, said electron discharge device having electrical connections therefrom for automatically controlling the temperature of the medium.

Other objects of my invention will become evident from the following detailed description, taken in conjunction with the accompanying drawing, in which.

One of the difficulties with the usual thermostats for controlling the temperature of a medium such as a furnace or bath, is that the thermostat has an off-and-on position that requires contacts and the consequent damage and noise caused by the arcs and clicks in moving from one position to another. Furthermore, these thermostats necessarily require a wide range of temperature between their minimum and maximum temperatures of the medium. They are very unsuitable for automatic use where the medium must be kept at one particular temperature, and not vary from this temperature to any extent.

A distinct disadvantage of the usual thermocouple lies in the very tiny output of electrical energy therefrom which makes it unsuitable for automatic use.

According to my invention, I have devised a heat-responsive electron-discharge device that is continually responsive to a variation in heat, especially in the temperature range from 50° to 200° C., and whose response to said temperature is an exponential function of the amount of heat. My invention eliminates the contact mechanisms of the thermostats and it has the distinct advantage over the usual thermo-couple in the fact that the output of the tube can be amplified with great ease to actuate the automatic control of the source of heat for the medium.

Figure 1:
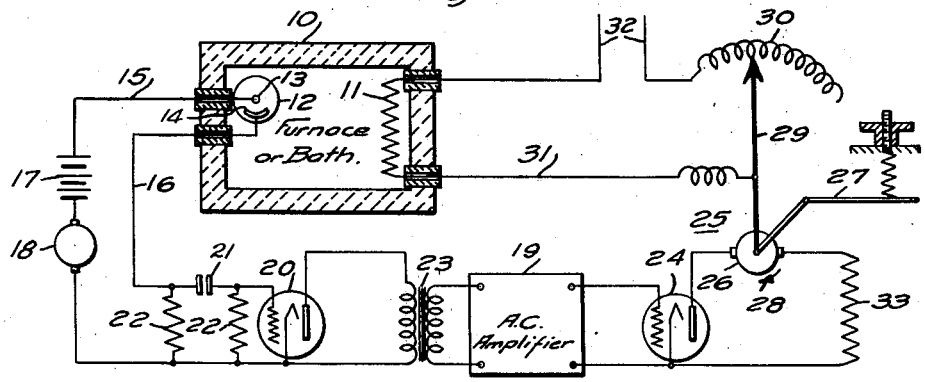
Figure 1 is a diagrammatic view of a system of control of a furnace or bath organized in accordance with the present invention and using alternating current.

In Fig. 1, I have disclosed a preferred system of control of a furnace or bath utilizing alternating current in accordance with my invention. The furnace or bath 10 has a source of heat 11 therefor which may be an electrical heat producing coil. Directly immersed in this furnace or bath is an electron discharge device 12 diagrammatically illustrated therein but whose preferred form is disclosed in Fig. 3. This electron discharge device has an anode 13 therein and a cathode 14 either within the tube or as a part of the envelope having heat-responsive electron-emitting material thereon. Connections 15 and 16 lead from the electron discharge device to the automatic control apparatus preferably located on the exterior of the furnace or bath. This exterior control system preferably has a battery 17 to maintain a potential drop across the electrodes and an alternating-current interrupter 18 which is preferably 60-cycle.

Any suitable amplifier means may be used, such as is diagrammatically indicated by the numeral 19, and this may be associated as desired by a tube 20 and suitable condenser 21, and resistance means 22 in addition to the usual transformer means 23. A power tube 24 is also illustrated, connected between the amplifier means and the temperature control means, per se, which is indicated by the numeral 25.

It is to be noted that the circuit connected to the electron discharge device is illustrative of one type of means for amplifying the output from the electron discharge device 12 and is not to be regarded as limiting the broad idea of the invention.

While many devices might be used for controlling the heating current in the coil 11 in response to the amplified signal from the electron discharge device 12, I have illustrated one preferred form of apparatus, but I do not intend to have the invention regarded as limited thereto. A small alternating-current motor 26 is connected to the output of the power tube 24 and has its armature synchronous with the 60-cycle interrupter 18. A resistance device 27 is connected to the armature of the alternating-current motor 26 to exert opposition to the torque of the motor, which torque is illustrated by the arrow 28, pointing in a clockwise direction. The armature is also connected through suitable bearings with an arm 29 acting as a contact arm in the resistance 30 connected in the heating circuit 31 of the heating coil 11 of the furnace or bath. The heating circuit 31 is, of course, connected to a suitable source of heating current 32. The field of the small alternating-current motor 26 is illustrated at 33.

The furnace or bath and the control system attached thereto are, of course, designed for automatically maintaining the furnace or bath at a certain temperature. Of course, it is within the skill of the usual electrical engineer to provide means for shifting the system so that the furnace or bath may be set at any desired temperature. The heating coil 11 will heat up the furnace or bath until the amount of heat affects the heat responsive device 12. As the amount of heat increases, there will be a greater increased output from the electron discharge tube because its response is a logarithmetic function of the amount of heat. This increased current is amplified by the amplifying system and produces more current through the field coil 33 of the alternating-current motor 26 and increases the torque 28 of the motor, so that it overcomes the opposition of the resistance device 27 and moves the resistance arm 29 clockwise to place more resistance in the heating circuit 31 and so decrease the amount of heat supplied by the heating coil 11 of the furnace or bath. By proper design, this response can be made instantaneous to any increase in the amount of heat of the medium and decrease also instantaneously the amount of heat supplied to the medium.

If the amount of heat in the furnace or bath decreases below the desired amount, then the current from the electron discharge device will decrease, with the result that the current through the field 33 of the motor 26 will decrease, the torque 28 will lessen so that the resistance device 27 will move against the torque of the armature and shift the arm 29 counter-clockwise to cut out part of the resistance 30 and so increase the amount of current through the coil 11, and thereby increase the amount of heat supplied to the furnace or bath 10.

Figure 2:
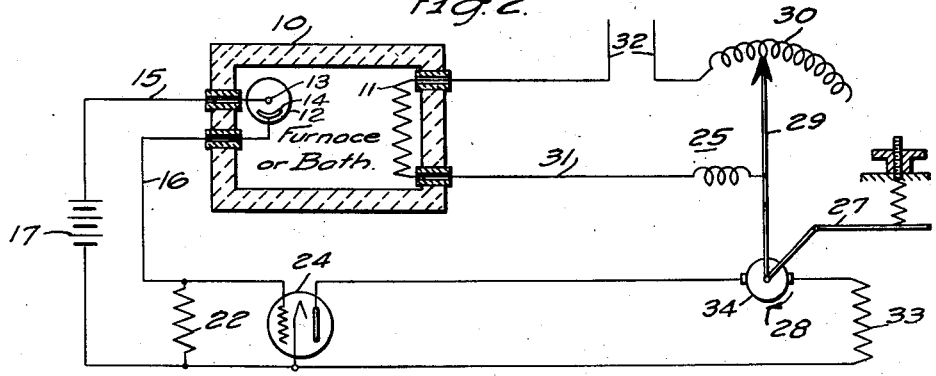
Fig. 2 is a diagrammatic view of a system of control similar to that of Fig. 1, except that direct-current is used.

In Fig. 2, I have disclosed a similar system utilizing direct current in place of alternating current. It will be noted that this system also has the battery 7, suitable resistance 22 and one or more tubes 24 connected to the direct-current motor 34 for controlling the heat supplied by the electrical coil 11 in the furnace or bath.

My heat responsive electron discharge device may take any one of many forms. I have discovered that a cathode having an electron material of caesium and preferably in the form of its compound caesium-oxide, is especially suitable to become electron-emitting in response to heat supplied in the temperature range of about 50° C. and upwards. Other alkali metals and their compounds may be used in place of or in conjunction with saesium and its compounds. For the higher temperatures, quartz is preferably used for the insulating parts of the envelope.

Figure 3:
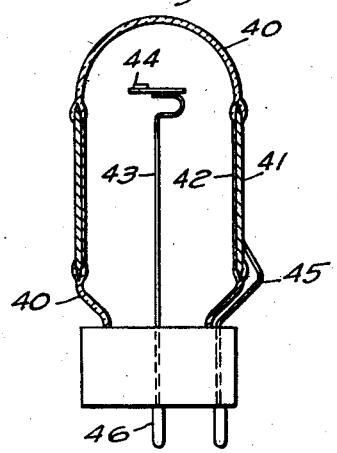
Fig. 3 is a cross-sectional view with certain portions in elevation of my preferred form of heat-responsive electron discharge device.

In Fig. 3, I have disclosed an electron discharge device in a form which is especially suitable to make a quick response to a change in the heat or temperature of the surrounding medium. The insulating part of the envelope 40 is sealed to a material 41 having a good thermal conductivity, such as copper. This copper is coated on the inside with a material that is electron-responsive in regard to heat, such as caesium oxide 42. On the interior of the tube is the anode 43 which is illustrated as supporting the pellet 44 that contained the caesium prior to its being flashed on the surface of the copper 41. If the medium is not electrically conducting, then contact can be made to the exterior of the copper anode 41 by means of the connection 45 disclosed, and another connection 46 can be made to the anode 43. If, however, the medium is apt to provide leakage of currents, then the connections to the electron discharge device can be covered with an electrically insulating but thermal conducting material. The copper anode 41, however, has the advantage that it is not only thermally conducting, but is more suitable for sealing in the insulating part of the tube, such as the glass or quartz portions 40.

Although I have shown and described certain specific embodiments of my invention, I am fully aware that many modifications thereof are possible. My invention, therefore, is not to be restricted except insofar as is necessitated by the prior art and by the spirit of the appended claim.

I claim as my invention:

Apparatus for controlling temperature of a medium comprising a source of heat for said medium, an amplifier for controlling said source, a device having two or more spaced electrodes connected to the input circuit of said amplifier and immersed in said medium, one of said electrodes having a material adapted to make the space between said electrodes current conducting in response to said heat said device having a metallic outer surface in direct thermal connection with said material.

EARL D. WILSON.